US 10,609,138 B2

(12) United States Patent
Patel et al.

(10) Patent No.: US 10,609,138 B2
(45) Date of Patent: Mar. 31, 2020

(54) SYSTEM AND METHOD FOR MOBILE DATA SYNCHRONIZATION

(71) Applicant: Kodiak Networks Inc., Plano, TX (US)

(72) Inventors: Krishnakant M. Patel, Richardson, TX (US); Ramu Kandula, Plano, TX (US); Brahmananda R. Vempati, Dallas, TX (US); Harisha Mahabaleshwara Negalaguli, Richardson, TX (US); Bharat Ram Setti Nagaswamy Srinivasan, Plano, TX (US); Ravi Ayyasamy, Richardson, TX (US)

(73) Assignee: KODIAK NETWORKS INC., Plano, TX (US)

( * ) Notice: Subject to any disclaimer, the term of this patent is extended or adjusted under 35 U.S.C. 154(b) by 654 days.

(21) Appl. No.: 15/148,633

(22) Filed: May 6, 2016

(65) Prior Publication Data
US 2016/0330279 A1 Nov. 10, 2016

Related U.S. Application Data

(60) Provisional application No. 62/158,384, filed on May 7, 2015.

(51) Int. Cl.
*H04L 29/08* (2006.01)
*H04W 4/08* (2009.01)
(Continued)

(52) U.S. Cl.
CPC ...... *H04L 67/1095* (2013.01); *G06F 16/2358* (2019.01); *H04L 51/22* (2013.01);
(Continued)

(58) Field of Classification Search
CPC .................................. G06F 17/30368
See application file for complete search history.

(56) References Cited

U.S. PATENT DOCUMENTS 3,912,874 A 10/1975 Botterell et al.
4,796,293 A 1/1989 Blinken et al.
(Continued)

FOREIGN PATENT DOCUMENTS

GB 2338150 A 3/1998
JP 200392776 A 10/2004
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — Richard L Bowen

(57) ABSTRACT

An embodiment includes receiving, by a client on a client device, a data change notification. The data change notification indicates a change in data relating to the client at a client data store. The method further includes determining, by the client, a type of the data relating to the client changed at the client data store and determining, by the client, a data synchronization mechanism in accordance with the type of the data relating to the client changed at the client data store. Determining the data synchronization mechanism includes determining when to attempt, by the client, a data synchronization to synchronize data on the client device with the data relating to the client changed at the client data store.

8 Claims, 7 Drawing Sheets

(51) Int. Cl.
*G06F 16/23* (2019.01)
*H04L 12/58* (2006.01)

(52) U.S. Cl.
CPC .............. *H04L 51/24* (2013.01); *H04W 4/08* (2013.01); *H04L 67/24* (2013.01)

(56) References Cited

U.S. PATENT DOCUMENTS

| | | |
|---|---|---|
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 6/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,340,651 B1 * | 12/2012 | Gailloux ............ H04L 67/1095 455/418 |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 9,692,878 B1 * | 6/2017 | Rosenthal ............ H04L 67/125 |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Wetman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0216524 A1 * | 9/2005 | Gomes ................ G06F 16/273 |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | Ladue |
| 2006/0234687 A1 | 10/2006 | Patel et al. |
| 2006/0291452 A1 | 12/2006 | Velagaleti et al. |
| 2007/0002011 A1 * | 1/2007 | Kurlander ............ H04L 67/12 345/156 |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0099609 A1 | 5/2007 | Cai |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |

(56) References Cited

U.S. PATENT DOCUMENTS

| | | |
|---|---|---|
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0037523 A1* | 2/2009 | Kolke ............... G06F 17/30873 709/203 |
| 2009/0047915 A1 | 2/2009 | Albertsson |
| 2009/0083441 A1* | 3/2009 | Clark ................. H04L 67/1095 709/248 |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0235185 A1 | 9/2009 | Gill |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2013/0064336 A1* | 3/2013 | Schadt ................ G06F 16/1787 375/354 |
| 2013/0155875 A1 | 6/2013 | Ayyasamy et al. |
| 2013/0196706 A1 | 8/2013 | Patel et al. |
| 2013/0337859 A1 | 12/2013 | Patel et al. |
| 2014/0148210 A1 | 5/2014 | Kundu et al. |
| 2014/0222757 A1 | 8/2014 | Huang et al. |
| 2014/0289225 A1* | 9/2014 | Chan ................... H04L 67/1095 707/722 |
| 2015/0358406 A1* | 12/2015 | Scheer .................. G06F 11/30 709/248 |
| 2016/0162370 A1* | 6/2016 | Mehta .................. G06F 16/162 707/610 |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |
| WO | 2015013449 A1 | 1/2015 |

OTHER PUBLICATIONS

Nokia: "What is TETRA? Why Nokia TETRA?", The Nokia Tetra Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", TRACKWELL.COM, Oct. 2002, pp. 1-1.

\* cited by examiner

SYSTEM AND METHOD FOR MOBILE DATA SYNCHRONIZATION

This application claims the benefit of U.S. Provisional Application No. 62/158,384, filed on May 7, 2015, which application is hereby incorporated herein by reference.

TECHNICAL FIELD

The present invention relates generally to communications over a telecommunications network, and in particular embodiments, to techniques and mechanisms for a system and method for data synchronization.

BACKGROUND

Database synchronization technologies may be used by mobile applications (e.g., applications on a client device) to allow a user to create and/or modify data locally on the client device even when the client device is not connected to a network. Thus, an enriched user experience can be provided, which allows the manipulation of data without being affected by the network connectivity status of a device. Mobile database synchronization mechanisms are used to synchronize user data with a backend database when a network connection between the client device and the backend database is available. Mobile database synchronization mechanisms may also be used to provide the client data on multiple interfaces (e.g., multiple client devices), to back-up (e.g., create redundant copies) the client data, and the like. The user-friendliness of mobile database synchronization mechanisms is leading to its increasing adoption.

As with many asynchronous synchronization mechanisms (e.g., not in real time synchronization), mobile database synchronization mechanisms may rely on long polling based logic or active notification based logic. However, these methods may not be efficient in terms of network resource utilization. For example, long polling methods involve a mobile application periodically polling a server to detect changes in the client data and trigger synchronization. Thus, long polling methods may be inefficient for managing data that changes infrequently. As another example, active notification based synchronization methods involve the mobile application maintaining a connection with the server to receive notifications of a change in client data. Furthermore, notifications may be delivered even when the mobile application is not in active use.

SUMMARY

Technical advantages are generally achieved, by embodiments of this disclosure which describe systems and methods for providing data synchronization in a PTT environment.

In accordance with an embodiment, a method includes receiving, by a client on a client device, a data change notification. The data change notification indicates a change in data relating to the client at a client data store. The method further includes determining, by the client, a type of the data relating to the client changed at the client data store and determining, by the client, a data synchronization mechanism in accordance with the type of the data relating to the client changed at the client data store. Determining the data synchronization mechanism includes determining when to attempt, by the client, a data synchronization to synchronize data on the client device with the data relating to the client changed at the client data store.

In accordance with an embodiment, a method includes receiving, by a notification server in a telecommunications services platform, a data change notification. The data change notification indicates a change to data relating to a client at a client data store by one or more services provided by the telecommunications services platform. The method further includes maintaining, by the notification server, a data change notification queue for the client, determining, by the notification server, a state of the data change notification queue, and determining, by the notification server, whether to transmit the data change notification to the client in accordance with the state of the data change notification queue.

In accordance with an embodiment, a telecommunications services platform includes a client data store storing data relating to a push-to-talk (PTT) client on a client device, one or more processors, and a computer readable storage medium storing programming for execution by the one or more processors. The programming includes instructions to provide one or more PTT services to the PTT client and provide a notification server. The notification server is configured to receive a data change notification indicating a change to the data relating to the PTT client by the one or more PTT services, transmit the data change notification to the PTT client when the notification server determines no data change notifications have been transmitted to the PTT client since a most recent time the PTT client successfully synchronized data with the client data store, and not transmit the data change notification to the PTT client when the notification server determines a previous data change notification has been transmitted to the PTT client since the most recent time the PTT client successfully synchronized data with the client data store.

BRIEF DESCRIPTION OF THE DRAWINGS

For a more complete understanding of various example embodiments, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Various embodiments are described within a specific context, namely, data synchronization in a push-to-talk (PTT) system. Various embodiments may, however, be applied to other systems and networks, where data synchronization between a backend client data store and client devices is desired.

Various embodiments as described below provide real-time and non-real-time data synchronization for data across one or more client devices and a backend client data store. Various embodiments allow for the flexibility of receiving data in real-time as well as providing network resource savings when using an asynchronous data synchronization mechanism.

Figure 1:
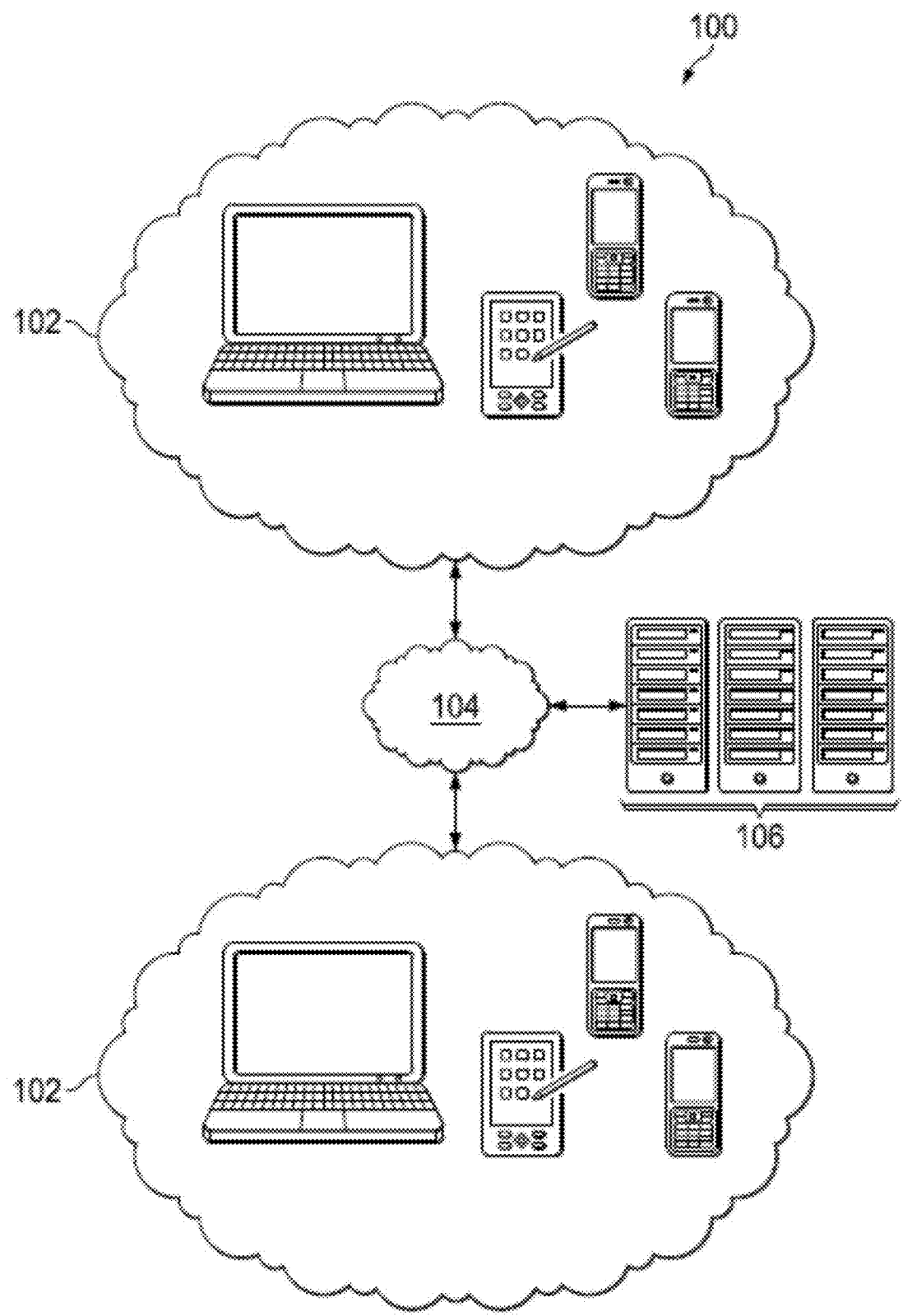
FIG. 1 illustrates a diagram of an embodiment communications network according to some embodiments.

FIG. 1 illustrates a communications system 100, which provides an architecture for supporting a telecommunications solution (e.g., a push-to-talk (PTT) communications solution) in accordance with some embodiments. Communications system 100 includes client devices 102, a communications network 104, and a telecommunications services platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "clients") reside on client devices 102 for accessing various functions, such as PTT functions, provided by the telecommunications solution.

Client devices 102 may communicate with telecommunications services platform 106 over network 104, which may be accessed by client devices 102 through a cellular network deployed by a carrier, a WiFi network, a radio access network (RAN), other wireless networks, a wired internet protocol (IP) network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other devices, such as relays, low power nodes, etc. Network 104 may further include backhaul network components, such as various gateways, routers, controllers, schedulers, and the like.

In an embodiment where telecommunications services platform 106 is a PTT-over-Cellular (PoC) platform, subscribers to a PTT solution (e.g., users operating client devices 102) may be provisioned onto system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. The PTT platform may provide a plurality of PTT functions to client devices 102 through the PTT clients on client devices 102 as described in greater detail below.

In some embodiments, telecommunications services platform 106 uses container technology for virtualization of a telecommunications system architecture, such as, the virtualization of provided PTT services. Example container technologies may include Docker, Rocket, LXD, and the like although the architecture is not limited to a specific container technology. Virtualization using container technology may allow telecommunications services platform 106 to adopt a micro-services model in which service clusters are considered the building blocks of the system architecture. For example, each function provided by telecommunications services platform 106 may be virtualized in a unique service cluster, and each service cluster may perform a different function in telecommunications services platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the telecommunications services platform) to be independently deployed and managed. Thus, system resilience may be improved as failures are localized to individual services. Furthermore, rapid and agile deployment of services may also be achieved.

In some embodiments, telecommunications services platform 106 incorporates distributed databases, clustering technologies, data analytics tools, and messaging middleware to provide a robust, scalable platform. Telecommunications services platform 106 may use fully virtualized components with a layered approach to service orchestration, which allows telecommunications services platform 106 to be integrated into various cloud environments, such as a carrier's private cloud infrastructure, a dedicated PTT cloud infrastructure, combinations thereof, and the like. A more detailed description of an embodiment telecommunications services platform may be found in commonly-assigned U.S. patent application Ser. No. 14/994,757 filed on Jan. 13, 2016, entitled "System and Method for Elastic Scaling using a Container-Based Platform," which is hereby incorporated by reference. Other telecommunication services platforms, including other PTT platforms, may be used in other embodiments.

Various embodiments allow different types of data synchronization mechanisms for different types of data. For example, some types of data may be synchronized using real-time data synchronization while other types of data may be synchronized using non-real-time data synchronization (also referred to as asynchronous data synchronization). Generally, as referred to herein, "real-time synchronization" refers to a synchronization mechanism where a client on a client device attempts to synchronize data when a data change notification is received regardless of whether the client is operating passively in the background of the client device or actively in the foreground of the client device. Furthermore, "non-real-time synchronization" refers to when a client on a client device waits to become active in the foreground of a client device before attempting to synchronize data when a data change notification is received. Although referred to as a non-real-time synchronization mechanism throughout, in practice, an embodiment non-real-time synchronization mechanism may include specific instances of real-time synchronization. For example, when a client receives a data change notification while the client is active in the foreground of the client device, the client may synchronize data in real-time even for types of data using a non-real-time synchronization mechanism. Thus, the use of terms "real-time" and "non-real-time" is not meant to implicitly limit the actual timing of synchronization. Rather, these terms are used to describe different types of data synchronization mechanisms, which include different types of client behavior upon receipt of a data change notification.

In an embodiment, the type of synchronization is determined by a user experience desired for a particular service, and the type of synchronization type for a particular service may be configured differently for different types of users. For example, presence and location updates notifications may be delivered in non-real time mode for users at a construction site or a school campus whereas the same information may be delivered in real time for users in the logistics industry. The types of data synchronization mechanisms for types of data may be configured by a user, a group administrator, a network administrator, a service operator, a standard, combinations thereof, or the like. Different types of data may also result in different types of notification mechanisms for indicating a change in data. For example, a non-real-time synchronization mechanism may or may not require real-time data change notifications depending on the type of data as explained in greater detail below.

Figure 2A:
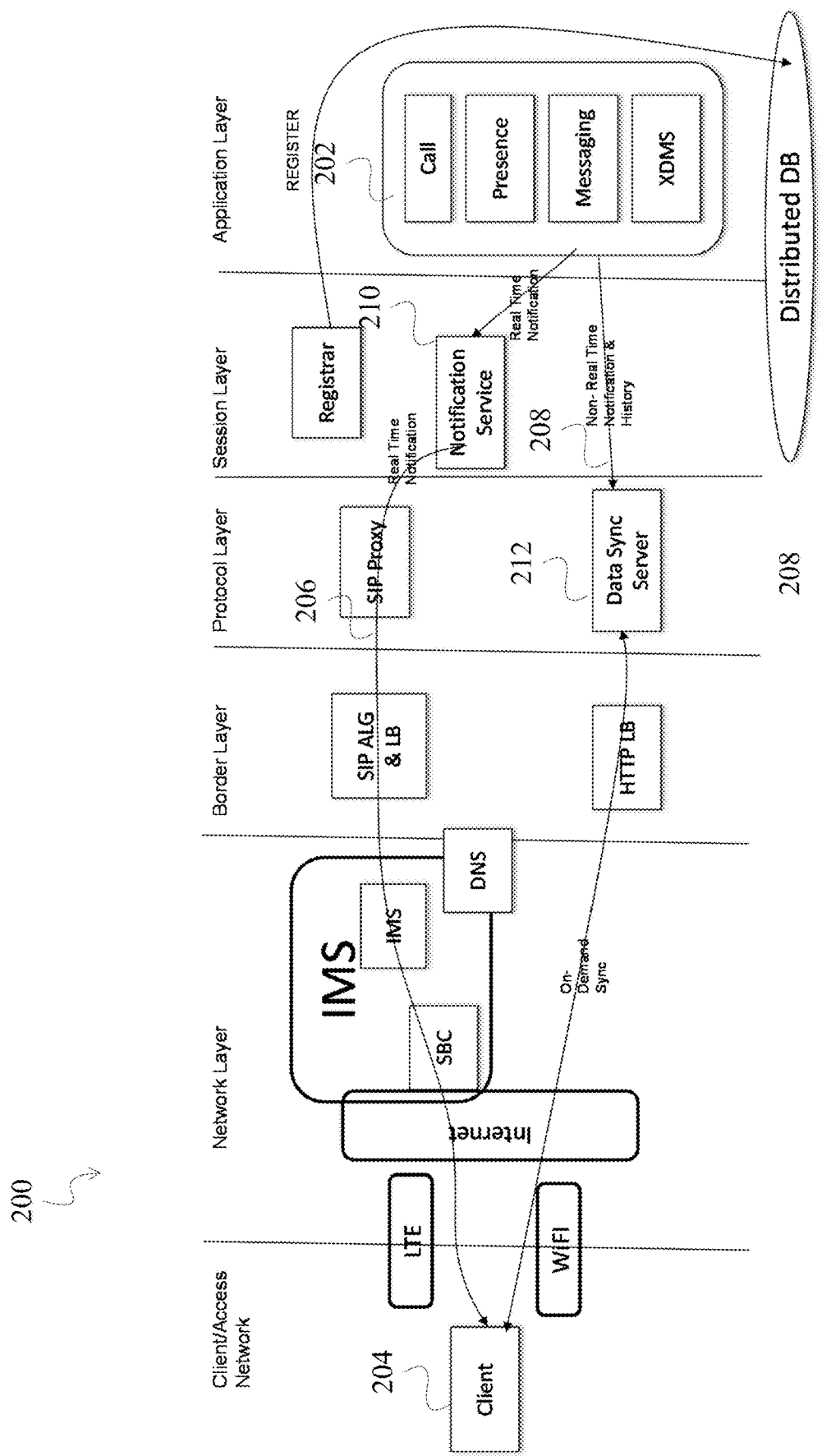
FIG. 2A illustrates a block diagram notification delivery channels a telecommunications services platform according to some embodiments.

FIG. 2A illustrate different types of notification mechanisms in an embodiment PTT platform 106. When a service 202 provided by the telecommunications services platform 106 creates or modifies data on behalf of a client, a data change notification and/or the data may be transmitted to a client 204 (e.g., a client on a client device 102). The data change notification indicates a change to data relating to client 204 was made at the client data store. In an embodiment PTT platform, services 202 includes a calling service, a presence service, a messaging service, an extensible markup language (XML) data management (XDM) service, a location service, combinations thereof, or the like. Other embodiments may include other services in addition to or in lieu of the illustrated services.

Furthermore, PTT platform 106 may include different notification channels, such as, real-time notification channel 206 and non-real-time notification channel 208. Real-time notification channel 206 may be provided through a notification service 210, for example, as described in U.S. patent application Ser. No. 15/013,718 filed on Feb. 2, 2016, entitled "Session Management and Notification Mechanisms for Push-to-Talk (PTT)," which is hereby incorporated by reference. Other real-time notification mechanisms may be used in other embodiments. Non-real-time notification channel 208 may be provided through a data synchronization server 212, which may provide notification-triggered synchronization mechanisms as described in greater detail with respect to FIGS. 3 through 5 below. An embodiment non-real-time notification method is described below in greater detail with regards to FIG. 2B. Other non-real-time notification mechanisms may be used as well.

In some embodiments, different types of data changes by different types of services may result in different types of data synchronization mechanisms as detailed in Table 1. Different types of data changes may further result in different types of notifications and/or different contents in the corresponding notification. Table 1 below provides some example types of data and corresponding types of notifications and data synchronization mechanisms in a PTT platform. In other embodiments, the types of data changes may result in other types of notifications/data synchronization mechanisms, and other types of data changes with corresponding types of notifications/data synchronization mechanisms may also exist in other embodiments. The types of notifications corresponding to different types of notifications/data synchronization mechanisms may be configured by a user, a group administrator, a network administrator, a service operator, a standard, combinations thereof, or the like.

TABLE 1

Types of Data Changes and Corresponding Notification Types

| Type of Data Change | Real-Time Notification Required? | Contents in Notification (e.g., data change notification) | Client Synchronization Immediately on Notification? | Expected Synchronization Invocation on Client Device? |
| --- | --- | --- | --- | --- |
| Presence changes | Not necessary | Pending change indication | No; Client marks there is a data change pending for synchronization | When the client comes to the foreground |
| XDM changes (contact data and/or group management data changes) | Not necessary | Pending change indication | No; Client marks there is a data change pending for synchronization | When the client comes to the foreground |
| Push-to-X text messaging notification | Yes | Pending change indication with contents | No; Client marks there is a data change pending for synchronization | When the client comes to the foreground |
| Push-to-X multimedia messaging service (MMS) notification | Yes | With meta contents (no attachment contents) | Conditional. If the user has automatic download for message attachments enabled, data synchronization is done immediately (e.g., in real-time upon receipt of the notification). Otherwise, the data synchronization is invoked when the | Meta content is synchronized when the client comes to the foreground. Attachment/multimedia contents synchronized when the client/user requests content download. |

TABLE 1-continued

Types of Data Changes and Corresponding Notification Types

| Type of Data Change | Real-Time Notification Required? | Contents in Notification (e.g., data change notification) | Client Synchronization Immediately on Notification? | Expected Synchronization Invocation on Client Device? |
|---|---|---|---|---|
| PTT over Cellular (PoC) instant personal alert (IPA); PoC call received data; PoC call sent data (e.g., for tracking call history) | Yes | Pending change indication with contents | user requests download of the attachment. No; Client marks there is a data change pending for synchronization | No explicit synchronization. Synchronization when client invokes data synchronization for other types of data. |
| Location tracking (e.g., Monitoring device locations of other client devices, such as, client devices of contacts and/or groups of client 204) | Not applicable | Not applicable | Devices reporting location or tracking the location continuously are synchronized continuously with a location server (e.g., watcher). Devices that publish locations periodically synchronizes location data periodically (or using other criteria) with other watcher devices. | Continuous synchronization when location service is active in client. |

As indicated by Table 1.0, some notifications (e.g., data change notifications) may include at least a portion of the contents of the changed data (e.g., text message contents, meta content, PTT IPA, PTT call status data, and the like) along with a pending change indication for certain types of data. In such embodiments, the contents are received in the notification and further synchronized as described above for archival purposes.

As an example regarding text messages, the data change notification may include a pending change indication as well as contents of the text messages. The notification alerts a user of the existence and contents of a new text message. However, the client may also store the text message as part of text message history (e.g., an archive to allow a user to access threaded message history, to search past text messages, and the like). A master of copy of archive may be maintained by a server (e.g., a client data store). In instances where text message data is synchronized using a non-real-time synchronization mechanism, the client will synchronize archival text message history with the server when the client comes to the foreground when the data change notification for text messages is received.

As another example regarding MMS messages, the data change notification may include a pending change indication as well as meta contents (e.g., sender information, recipient(s) information, subject lines, thumbnails of a MMS attachment, and the like) of the MMS message. The notification alerts a user of the existence and meta contents of the MMS message. However, the client may also store the meta contents of the MMS message history (e.g., an archive to allow a user to access threaded message history, to search past MMS messages, and the like). A master of copy of archive may be maintained by a server (e.g., a client data store). In instances where MMS meta content is synchronized using a non-real-time synchronization mechanism, the client will synchronize archival text message history with the server when the client comes to the foreground when the data change notification for MMS messages is received. The attachment of the MMS message may be synchronized based on client configuration. For example, when the client is configured to automatically download MMS message attachments, data synchronization is done immediately (e.g., in real-time upon receipt of the notification). Otherwise, the data synchronization for the attachment is invoked when the user requests download of the attachment. The above two examples of synchronizing archival data may further be applied for other types of data, such as, IPAs, call history data (e.g., call received data, call sent data, call duration data, and the like), combinations thereof, and the like.

Figure 2B:
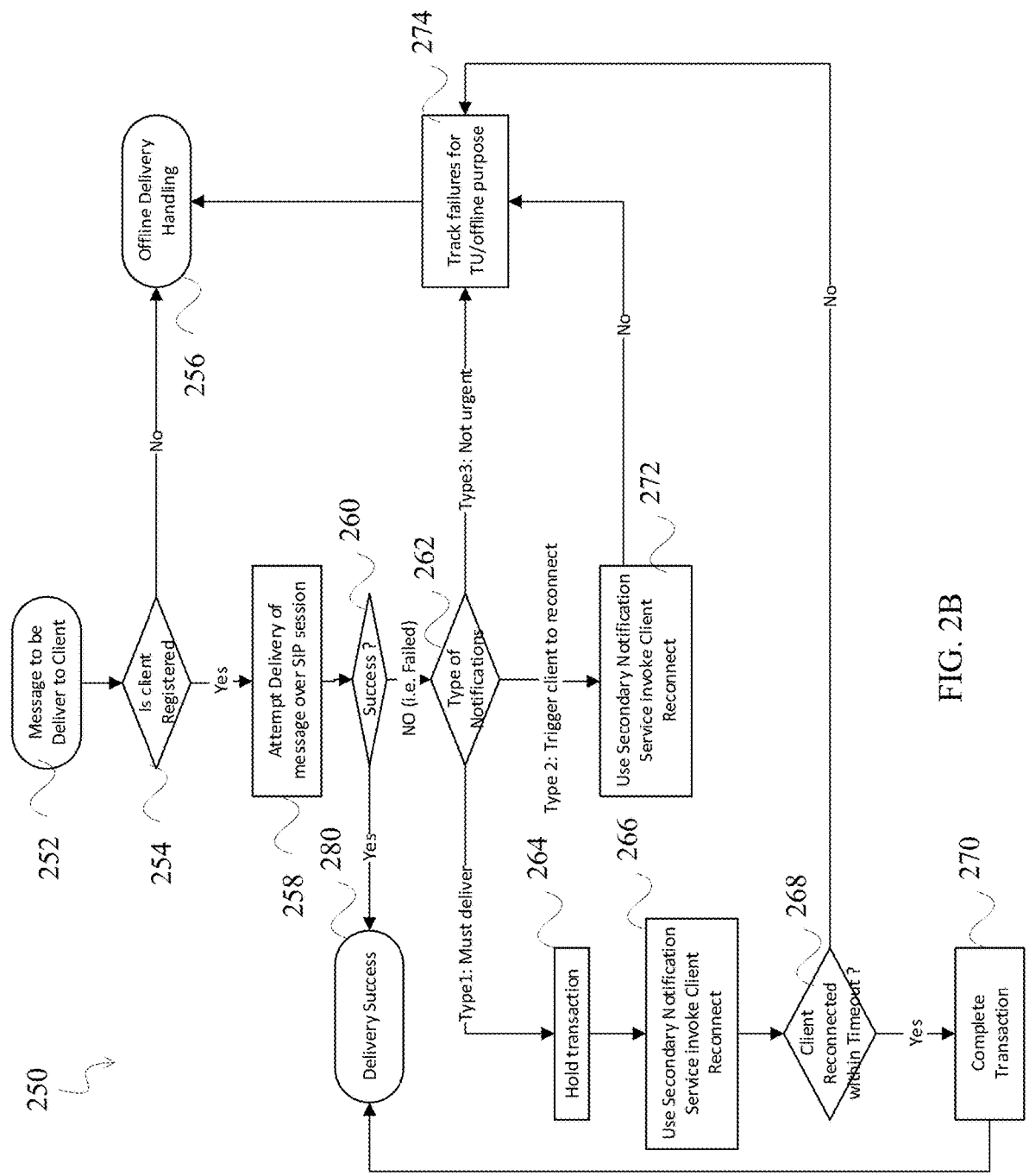
FIG. 2B illustrates a process flow of notification delivery according to some embodiments.

FIG. 2B illustrates a flow chart 250 for notification delivery in an embodiment platform. The steps in flow chart 250 may be performed by a notification service 210 (e.g., for real-time notifications) in combination with a data synchronization server 212 (e.g., for offline delivery handling). In step 252, a message is received for delivery to a client (e.g., client 204) on a client device (e.g., client device 102). In step 254, a determination is made regarding whether the client is registered. If the client is not registered, the message is transferred for offline delivery handling in step 256. In an embodiment, data in offline delivery handling is synchronized with the client when the client comes online. If the client is registered, an attempt to deliver the message over a session initiation protocol (SIP) session (or other real-time delivery mechanism) is made in step 258. In step 260, a determination is made as to whether the message was delivered successfully. If the message was delivered successfully, the process ends in step 280.

If the message was not successfully delivered, a determination is made regarding the type of notification being delivered in step 262. Depending on the type of notification, different notification mechanisms may be used when a message is not successfully delivered. For example, in FIG. 2B, Type 1 notifications require real-time delivery. For Type 1 notifications, the transaction is held in step 262 and a secondary notification service is used to trigger the client to reconnect with the primary real-time delivery channel in step 266. If the client successfully reconnects within a timeout period, the message is delivered to the client in step 270 and the process ends. If the client does not successfully reconnect within the timeout period, the message is sent to offline delivery handing (step 256) after tracking the message delivery failure for identifying temporarily unreachable (TU) devices (e.g., devices that are temporarily disconnected from the network and/or the server) and/or offline purposes (step 274). As another example, Type 2 notifications simply trigger clients to reconnect. Thus, for a Type 2 notification, the server uses a secondary notification channel to notify the client to reconnect with the primary real-time notification channel in step 272. Subsequently, the message is sent to offline delivery handing (step 256) after tracking the message delivery failure for TU/offline purpose (step 274). Type 3 notifications are for non-urgent notifications. For delivery failure of Type 3 notifications, the message is sent to offline delivery handing (step 256) after tracking the message delivery failure for TU/offline purpose (step 274) without using the secondary notification channel.

Various embodiments provide mechanisms for real-time and non-real-time data synchronization with improved network resource management. For example, network resources may be wasted on data synchronization of certain types of data when a client is running as a background process. As another example, network resources may be wasted if the client performs a data synchronization check (e.g., check for data changes) every time the client is brought to foreground. Resources used to poll a server for data changes may be especially wasteful for types of data that do not change frequently. For example, configuration change notifications, group list updates, contact list updates, presence statuses for some types of users, and the like may be examples types of data that do not change frequently. Other types of data may also change infrequently.

In an embodiment, a notification server (e.g., as part of data synchronization server 212 and/or notification service 210) notifies the client when there is a change to data. Subsequently, the notification server may not send any further notifications to the client regarding non-real-time synchronization type data until the client successfully synchronizes data with a backend client data store even when there are additional changes to data relating to the client. In such embodiments, the notification server may or may not transmit subsequent notifications for real-time synchronization type data between an initial notification and when a client successfully synchronizes data with a backend client data store. Thus, network resources may be saved by transmitting a single notification, which indicates to the client that there are data changes at the client data store and triggers the client to synchronize its data with the network. Additional network resources to transmit additional notifications (e.g., for additional changes in data) between a data change notification and data synchronization may be saved. After the client synchronizes data, the notification server may transmit another notification to the client when a subsequent data change occurs. Various notifications from the notification server (including data change notifications) may further be throttled to reduce network resource congestion (e.g., RAN resource congestion) as explained in greater detail below.

Furthermore, for non-real-time synchronization types of data, a client may only perform data synchronization when the user brings the client to the foreground (e.g., when the user opens the client for use). Data synchronization may not be triggered each time the client is brought to the foreground. Rather, the client determines if a data change notification was received since a most recent successful data synchronization to trigger a subsequent data synchronization. In some embodiments, the client may not actively poll the server for changes and relies on data change notifications to determine when a change in data has occurred. The client may further synchronize data with the platform when the client regains network connectivity with the platform after the client was offline. In this way, missed data change notifications (e.g., while the client was offline) does not result in a delay or loss in synchronizing data. Thus, network resources for polling the server for data change (particularly for data that changes infrequently) can be saved.

Figure 3:
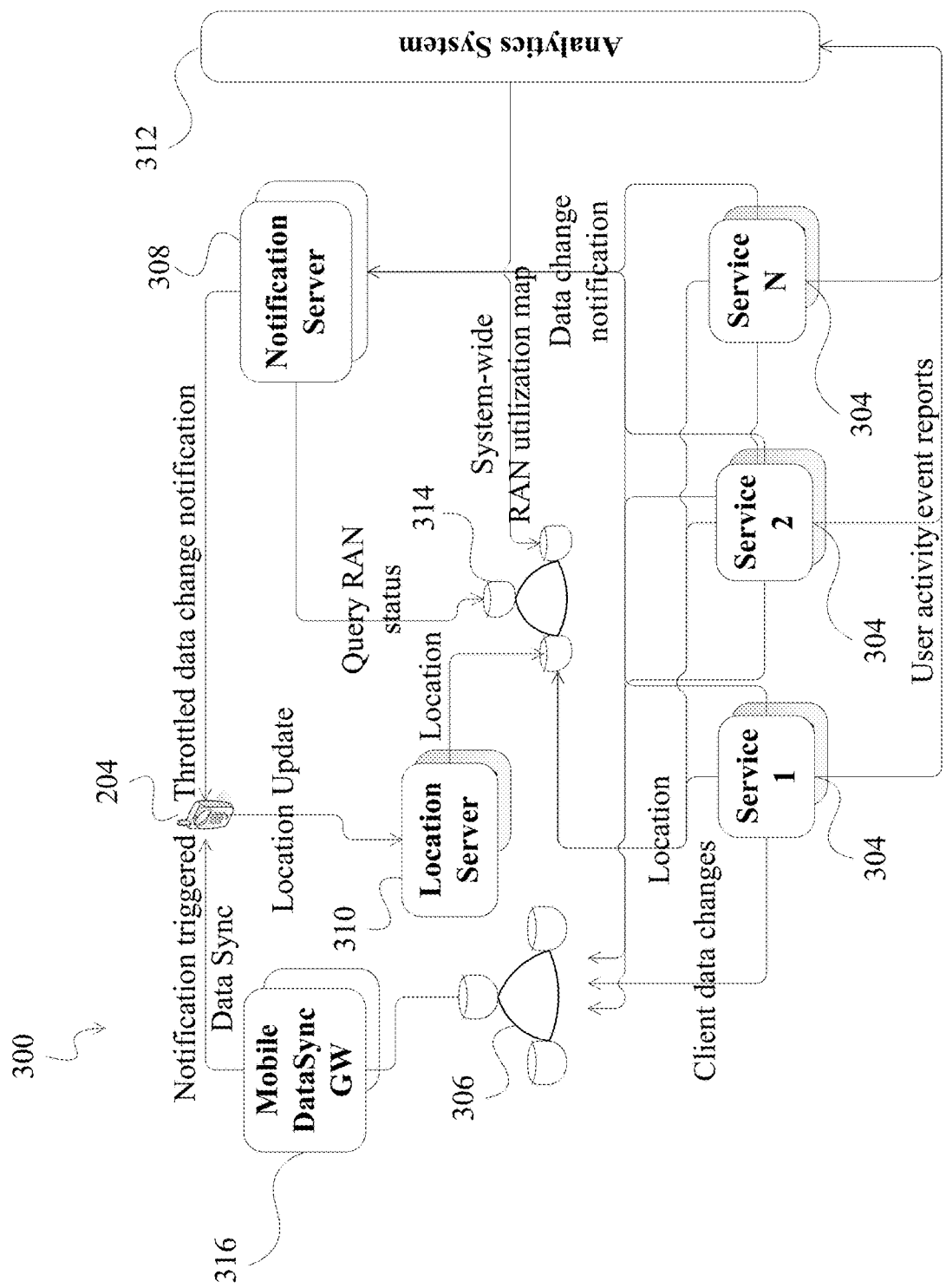
FIG. 3 illustrates a block diagram of notification triggered data synchronization mechanism in a telecommunications services platform according to some embodiments.

FIG. 3 illustrates a portion of telecommunications services platform 106, which may be used to provide a notification-triggered data synchronization mechanism, which allows real-time and non-real-time data synchronization for a client 204 on a client device (e.g., client device 102 in FIG. 1). Client 204 may use a data synchronization enabled backend client data store 306 (e.g., an electronic database, such as a cloud storage system, or the like) to manage data pertaining to one or more services 202 provided by telecommunications services platform 106. In an embodiment, client data store 306 may be part of data synchronization server 212 or a separate entity from data synchronization server 212. Data stored in client data store 306 may be created and/or modified by client 204 directly. Any changes initiated by a user (e.g., an operator of the corresponding client device) may be synchronized with client data store 306 when a network connection between client 204 and client data store 306 is available. Backend services 202 may also create and/or modify data in client data store 306 on behalf of client 204. Changes to client data performed in the backend (e.g., performed by services 202) are synchronized to the client through a real-time synchronization mechanism and/or a notification-triggered data synchronization mechanism for non-real-time synchronization depending on the type of data changed. A mobile datasync gateway (GW) 316 facilitates access to client data store 306 by client 204. In an embodiment, mobile datasync GW 316 may be part of data synchronization server 212 or a separate entity from data synchronization server 212. For example, client 204 may back-up data and synchronize changes to data performed by other devices (e.g., services 202 and/or other client devices operated by the user) through mobile datasync GW 316.

In an embodiment, client 204 uses various services 202, and data used for the operation of these services is stored in client data store 306. In an embodiment PTT platform, services 202 may include PTT call servers (e.g., for providing PTT calls), presence servers (e.g., for tracking availability and status of contacts and/or groups), messaging servers (e.g., for text messages, multimedia messages, and/or the like), XDM servers (e.g., for contact data and/or group management data), location services, and the like. Services 202 may transmit client data changes to client data store 306.

When a service 202 creates or modifies data in client data store 306, the service 202 transmits a data change notification to notification server 308. In an embodiment, notification server 308 may be part of notification service 210 or a separate entity (e.g., part of data synchronization server 212). Notification server 308 delivers data change notifications sent by services 202 to client 204. Data change notifications for non-real-time data synchronization types of data may or may not be delivered to a client depending on whether a previous data change notification was delivered and whether a client has completed data synchronization after the previous data change notification and the type of data changed. For example, if a data change notification has already been transmitted to client 204 since the most recent time client 204 successfully performed data synchronization, notification server 308 does not deliver the subsequent data change notification to client 204. As another example, if a data change notification has not been transmitted to client 204 since the most recent time client 204 successfully performed data synchronization, notification server 308 does deliver the data change notification to client 204. Furthermore, a user (or other operator) may designate certain types of data for real-time notifications, and a data change notification may be transmitted for these types of data each time a change occurs regardless of whether a previous notification was sent since a most recent successful synchronization.

In some embodiments, notification server 308 may further interact with location server 310 and analytics system 312 to determine network resource (e.g., RAN resource) congestion status at the location of client 204 (e.g., the location of the client device on which client 204 resides). Notification server 308 may determine whether to throttle messages (e.g., notifications) when delivering the data change notifications to client 204 in accordance with interactions with location server 310 and analytics system 312.

Location server 310 tracks the RAN location for active clients (e.g., client 204) in the telecommunications services platform. For example, location server 310 may track which cells (e.g., base stations, macro-cells, femtocells, Wi-Fi APs, combinations thereof, and the like) serve clients (e.g., client 204) in the telecommunications services platform. Location information is collected through location updates sent by clients (e.g., client 204). In some embodiments, the client transmits location updates piggy-backed on other messages between the client and the various components of the telecommunications services platform. For example, location updates may be piggy-backed on service requests sent by various clients when accessing services 202.

Various services 202 report user activity to analytics system 312. This user activity data is used by analytics system 312 to create a system wide network resource utilization map (e.g., a RAN utilization map). The network resource utilization map may continuously track and monitor what network resources are being used by different cells in a network.

Notification server 308 may use the network resource utilization map and the location information to determine whether to throttle delivery of data change notifications to clients in congested areas. For example, notification server 308 may ensure that the number of notifications delivered by any cell in the network is below a maximum threshold within a certain time period. For example, notification server 308 allows delivery of data change notifications to clients served by a first cell within a first time period until a maximum number of notifications threshold is reached. The maximum number of notifications threshold and/or time periods may be configurable and set by the telecommunications system operator, a standard, a combination thereof, or the like. Once the maximum number of notifications threshold is reached, notification server 308 may hold additional notifications for delivery by the first cell until the next time period. Thus, network resources are not overwhelmed by notification delivery.

Various embodiments include real-time and non-real-time data synchronization mechanisms, which advantageously provide data synchronization with improved efficiency in network resource utilization. In an embodiment platform, a client (e.g., a client 204 on client device 102) waits to receive a data change notification from a telecommunications services platform to determine when data change(s) has occurred instead of periodically polling a client data store to detect data changes. The client is not required to keep an active connection with the telecommunications services platform to receive pushed data changes in real-time. Instead, as described above with respect to FIG. 2B, types of data changes configured for real-time notifications may be pushed to the client when a network connection is available, and the real-time notifications may be queued for delivery while the client is offline. Upon receiving a data change notification, the client may immediately synchronize with a client data store (e.g., sometimes referred to as real-time synchronization) or wait until the client is brought to the foreground of the client device by the user (e.g., non-real-time synchronization). In an embodiment, the data change notification indicates the type of data changed, and the client determines whether to perform real-time or non-real-time synchronization may be in accordance with the type of data changed (e.g., as configured by a user operating the client device). For example, in an embodiment PTT service as described in Table 1, presence changes, contact data changes, group management data changes, push-to-X text message notifications, push-to-X multimedia message service notifications, PoC IPAs, call-related notifications (e.g., changes to a PTT call in progress notification, a PTT call completed notification, and the like), combinations thereof, or the like may be synchronized using a non-real-time synchronization mechanism while location tracking data changes (e.g., location tracking of a client's contacts and/or groups) may use real-time synchronization. In other embodiments, any of the above example types of data (e.g., client data store is presence data, contact data, group management data, a push-to-X text message notification, a push-to-X multimedia message service notification, a push-to-talk (PTT) over cellular (PoC) IPAs, location tracking data, call-related notifications, or a combination thereof) may be synchronized using real-time or non-real-time data synchronization mechanisms as configured by a user, a group administrator, a network administrator, a service operator, a standard, combinations thereof, and the like.

Furthermore, whenever the client is brought to the foreground, the client may not automatically trigger data synchronization. For example, the client may initiate data synchronization if at least one data change notification was received while the client was in the background. As another example, the client may initiate data synchronization if the client temporarily lost network connectivity for at least a configurable interval of time to catch missed data change notifications during the lost network connectivity.

Figure 4:
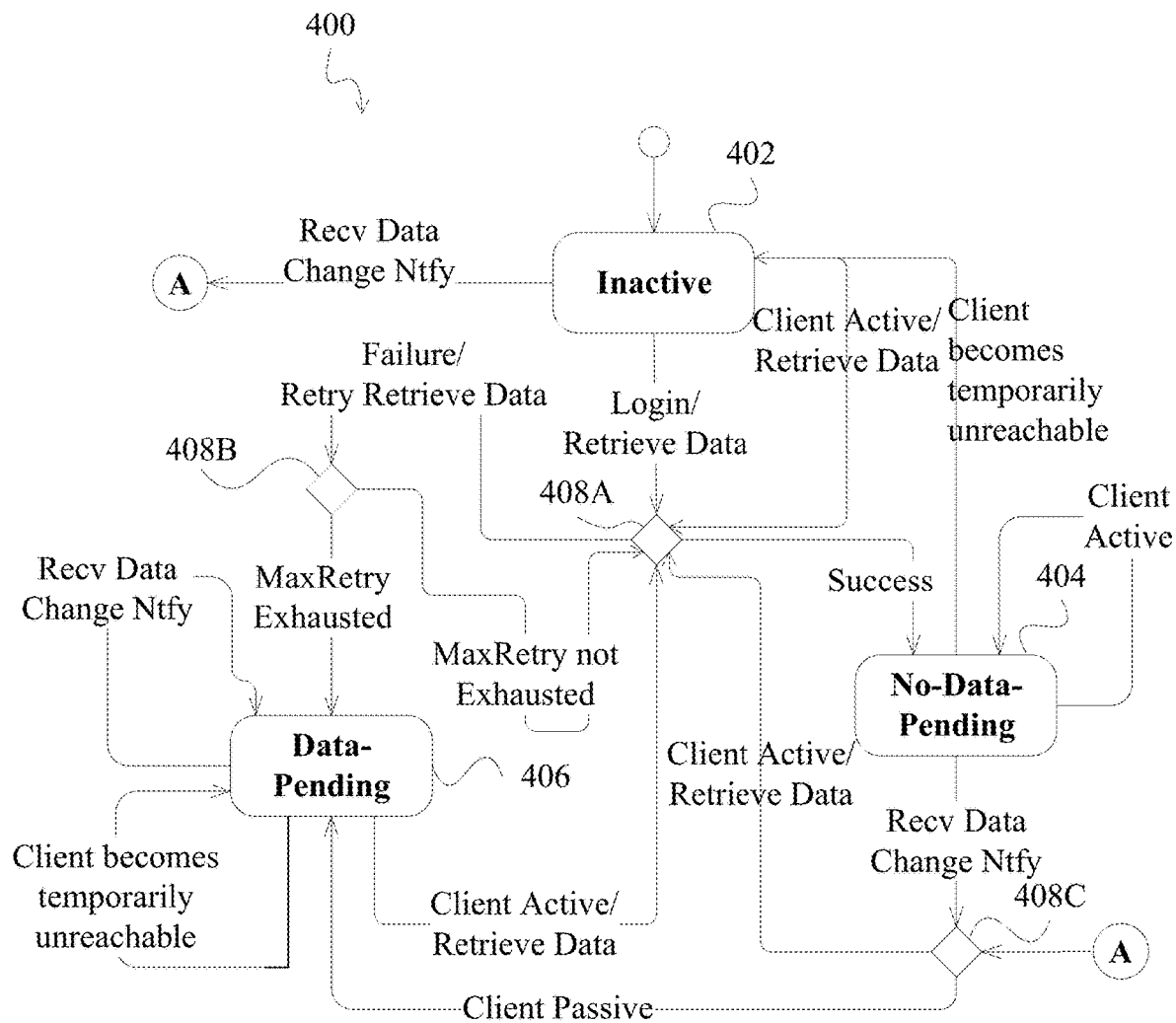
FIGS. 4 through 5 illustrate logic flows for device and server operations according to some embodiments.

FIG. 4 illustrates a logic flow 400 of a client (e.g., client 204) on a client device (e.g., client device 102) implementing an embodiment non-real-time data synchronization mechanism. FIG. 4 may illustrate interactions between the client, a notification server (e.g., notification server 308), and a data synchronization server (e.g., data synchronization server 212). Logic flow 400 may be used by the client on the client device to determine whether to attempt data synchronization with a backend server (e.g., data synchronization server 212). A client implementing logic flow 400 may be one of the following three states: inactive state 402, no-data-pending state 404, or data-pending state 406.

The client may enter inactive state 402 on startup of the client device and when client loses network connectivity/becomes temporarily unavailable. In inactive state 402, the client attempts to synchronize client data on the client device with data on the client data store (step 408A) as a result of a login attempt (e.g., attempt to re-connect with the client data store) and/or when the client is brought to the foreground (e.g., when the client switches from a background process to an active process). When the client successfully synchronizes data between the client device and the client data store, the client transitions to no-data-pending state 404. If the attempt to synchronize data (step 408A) is unsuccessful, the client determines whether to retry data synchronization (step 408B). For example, the client may retry the attempt to synchronize data until a maximum number of retries (designated MaxRetry) is exhausted. The maximum number of retries may be a configurable number set by the telecommunications services platform, the user, a standard, a combination thereof, or the like. When the maximum number of retries for data synchronization has been exhausted, the client may enter data-pending state 406.

Furthermore, when the client receives a data change notification (e.g., from a notification server) while in inactive state 402, the client determines whether it is running active in the foreground of the client device or passively in the background of the client device (step 408D). For example, the client determines whether it is actively running on the client device or running as a background process of the client device. When the client application is active in the foreground of the client device, client attempts data synchronization (step 408A). Success or failure of the data synchronization procedure may result in transitioning into no-data-pending state 404, data synchronization procedure retries, and/or transitioning into data pending state 406 as discussed above. When the client application is passive in the background of the client device, the client transitions to data-pending state 406 upon receiving the data change notification in inactive state 402.

The client enters no-data-pending state 404 when the client successfully completes data synchronization. When the client receives a data change notification from the server when in no-data-pending state, the client determines whether it is active in the foreground of the client device or passive in the background (step 408C). For example, the client determines whether it is actively running on the client device or running as a background process of the client device. When the client application is active in the foreground of the client device, client attempts data synchronization with the server (step 408A). When the client application is passive in the background of the client device, the client transitions to data-pending state 406 upon receiving the data change notification in no-data-pending state 404.

Success or failure of the data synchronization procedure may result in staying in no-data-pending state 404, data synchronization procedure retries, and/or transitioning into data pending state 406 as discussed above. For example, upon successfully synchronizing data in no-data-pending state 404, the client remains in no-data-pending state 404. If data synchronization fails in no-data-pending state 404, client retries data synchronization until a maximum number of retry attempts is exhausted. When the maximum number of retry attempts is exhausted, the client enters data-pending state 406. If the client loses network connectivity (e.g., becomes temporarily unavailable to the server) when the client is in no-data-pending state 404, then client transitions to inactive state 402.

The client enters data-pending state 406 when the client has received a data change notification from the server while the client application is passive in the background. The client may further enter data-pending state 406 when attempts at data synchronization have failed more than the maximum number of retry attempts.

In data-pending state 406, the client ignores all subsequent data change notifications received from the notification server. Furthermore, in data-pending state 406, when the client loses network connectivity (e.g., becomes temporarily unavailable to the telecommunications services platform), the client may remain in data-pending state 406.

When the client becomes active (e.g., brought to the foreground by a user or the client device's operating system), the client attempts data synchronization (step 408A) with a data synchronization server. Success or failure of the data synchronization procedure may result in transitioning into no-data-pending state 404, data synchronization procedure retries, and/or remaining into data-pending state 406 as discussed above. For example, upon successfully synchronizing data in data-pending state 406, the client transitions to no-data-pending state 404. If the data synchronization attempt fails in data-pending state 406, the client retries data synchronization until a maximum number of retry attempts is exhausted. When the maximum number of retry attempts is exhausted, the client remains in data-pending state 406.

Figure 5:
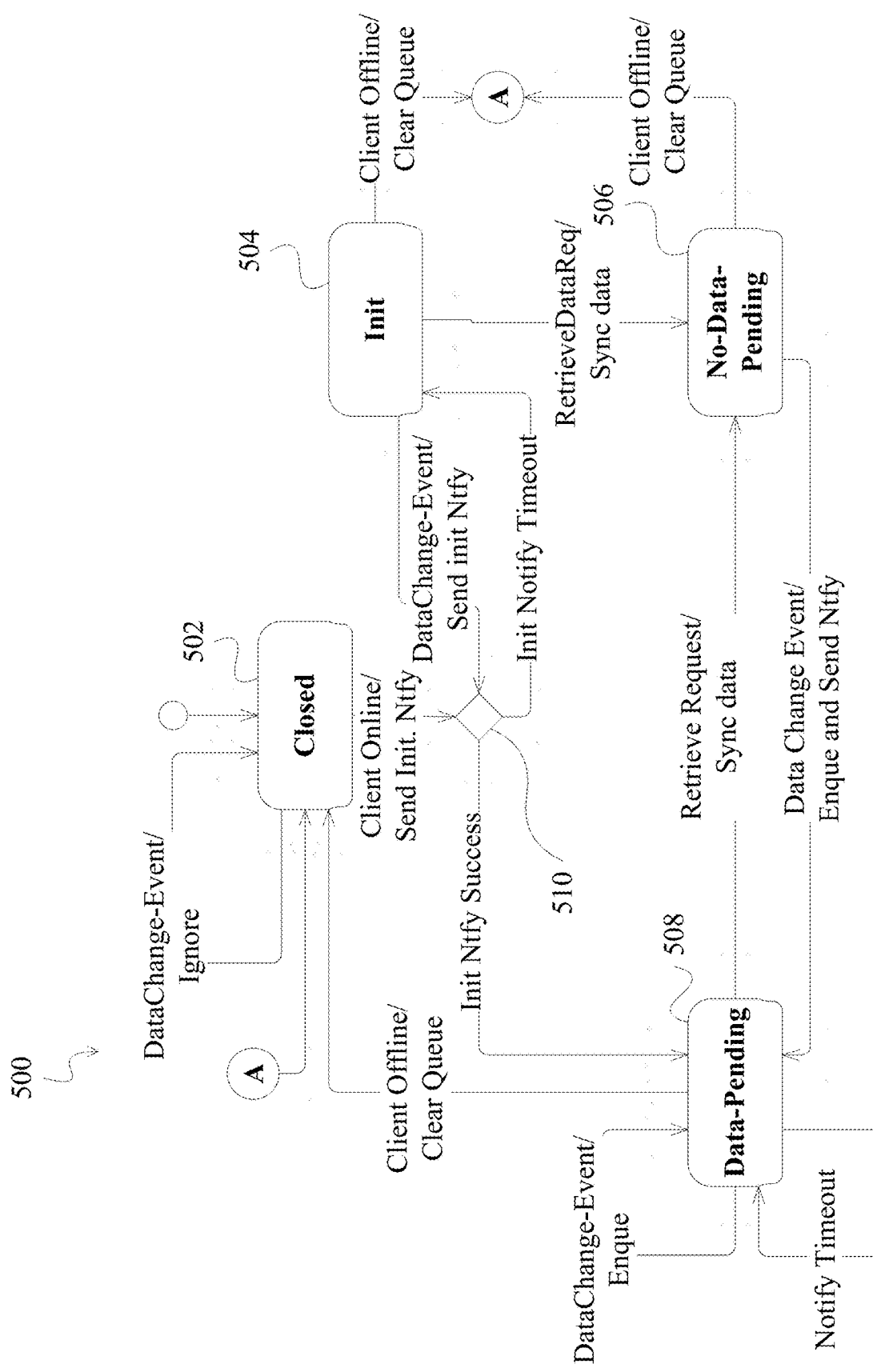

FIG. 5 illustrates a logic flow 500 of notification server logic for non-real-time data synchronization. When data is created or updated in a client data store (e.g., client data store 306), the notification server sends a data change notification to a client on a client device. The notification server may not send subsequent notifications to the client for subsequent data changes until the client successfully synchronizes data with the client data store. When sending data change notifications to the client, the server may further use location information and real-time service usage data determine network resource (e.g., RAN resource) capacity utilization status. The notification server may determine whether to throttle data change notifications (e.g., to reduce RAN congestion) in accordance with the network resource capacity utilization status as described above.

In an embodiment, the notification server maintains a data change notification queue for each mobile client served by the notification server, such as, each client relying on the notification server to deliver notifications. FIG. 5 illustrate various states of a data change notification queue maintained by notification server for a client device. The data change notification queue may be in any one of the following states: closed state 502, init state 504, no-data-pending state 506, and data-pending state 508.

Data change notification queue is in closed state 502 when the client is offline. In closed state 502, the notification server ignores data changes notifications by the client data store and/or the various services provided by the platform. For example, the notification server may discard all data change notifications relating to the client received while the data change notification queue is in closed state 502. When the client comes online and is connected to the server, the notification server attempts to transmit an initial data change notification to the client. This notification may be sent regardless of whether any data changes occurred while the client was offline. If the initial data change notification is delivered successfully to the client, the notification server transitions the data change notification queue to data-pending state 508. The initial data change notification triggers the client to attempt data synchronization. If the initial data change notification is not delivered successfully, the notification server transitions the data change notification queue to init state 504.

When a data change notification queue is in init state 504, the notification server may retry sending the initial data change notification to the client one or more times. The data change notification queue stays in init state 504 until the initial data change notification is delivered to the client successfully or the client successfully completes a data synchronization attempt. Upon successful delivery of the initial data change notification, the state of the data change notification queue is transitioned to no-data-pending state 506. Similarly, when the client successfully completes data synchronization while the data change notification queue is in init state 504, the state of the data change notification queue is transitioned to no-data-pending state 506. If the client goes offline when the data change notification queue is in init state 504, the state of the data change notification queue is transitioned to closed state 502. Transitioning to closed state 502 may further include clearing the data change notification queue.

The data change notification queue enters data-pending state 508 after at least one data change notification has been delivered to the client. This can occur when the initial data change notification is delivered to the client; at the time of client login; or when a data change notification is received by the notification server while the data change notification queue is in no-data-pending state 506.

In data-pending state 508, the notification server enqueues subsequent data change events until the client successfully completes data synchronization with a client data store. In an embodiment, the subsequent data change events are determined by the notification server from subsequent data change notifications transmitted to the notification server by the client data store and/or various services in the platform. The notification server may further determine when a client successfully completes data synchronization from a notification transmitted by, for example, a data synchronization server (e.g., data synchronization server 212). In some embodiments, the notification server may optionally transmit data change notifications while in data-pending state 508 for certain types of data (e.g., data where real-time notifications are desired). When the client retrieves pending data by successfully completing data synchronization, the data change notification queue is transitioned to no-data-pending state 506 and the enqueued data change events may be cleared.

If the client goes offline when the data change notification queue is in data-pending state 508, the data change notification queue is cleared and the state of the data change notification queue is transitioned to closed state 502.

The data change notification queue enters no-data-pending state 506 when the client successfully synchronizes data with the client data store. In no-data-pending state 506, the notification server waits for a data change event to occur (e.g., as reported by a service) and sends a data change notification to the mobile client when the data change event occurs. After sending the data change notification to the client, data change notification queue state is transitioned to data-pending state 508. If the client goes offline when the data change notification queue is in no-data-pending state 506, the state of the data change notification queue is transitioned to closed state 502. Transitioning to closed state 502 may further include clearing the data change notification queue.

In various embodiments, the notification server may also throttle data change notifications based on client location and network resource utilization at the client location. For example, a client reports its location information to a location server as part of its login and login session refresh procedures. The location information may also be piggy-backed in service requests sent by the client. This location information is processed by an analytics system in real-time and a network resource utilization map is generated and maintained by the analytics system. For example, the network resource utilization map may be maintained and updated continuously in real-time to track network resource utilization and/or capacity at various locations in the network. When sending data change notifications to various clients, the notification server may use of the network resource utilization map to throttle the notifications and not exceed a maximum configured threshold for the network utilization level at any given network location (e.g., any cell).

Figure 6:
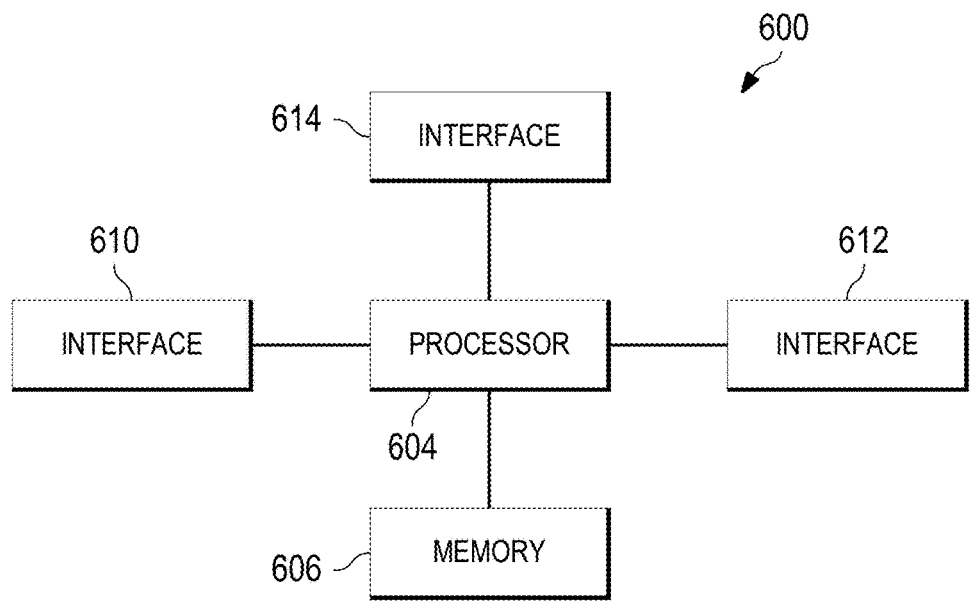
FIG. 6 illustrates a diagram of an embodiment processing system.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
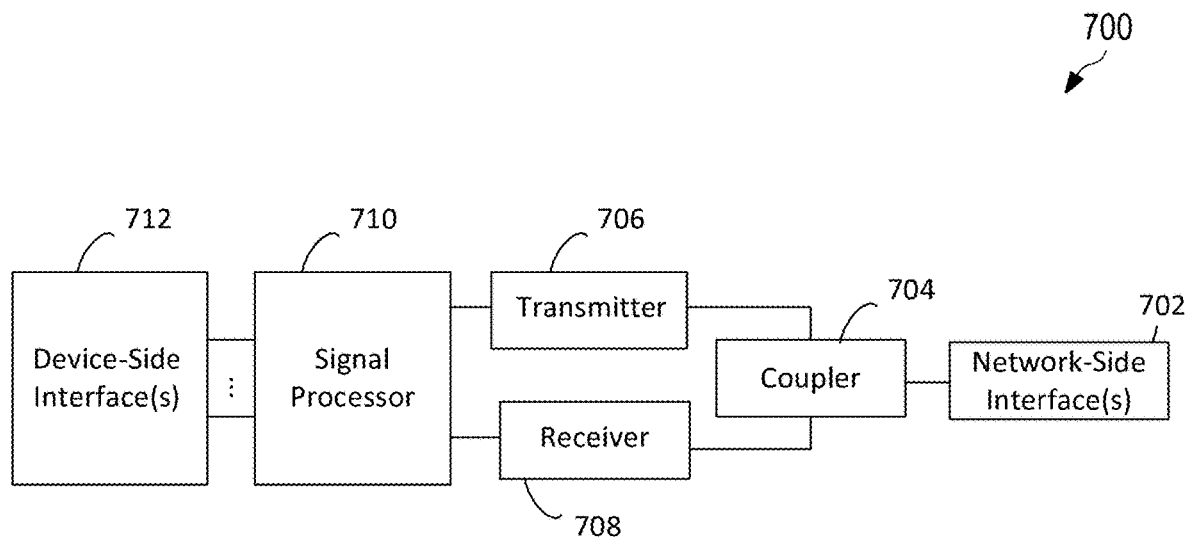
FIG. 7 illustrates a diagram of an embodiment transceiver.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In accordance with an embodiment, a method includes receiving, by a client on a client device, a data change notification. The data change notification indicates a change in data relating to the client at a client data store. The method further includes determining, by the client, a type of the data relating to the client changed at the client data store and determining, by the client, a data synchronization mechanism in accordance with the type of the data relating to the client changed at the client data store. Determining the data synchronization mechanism includes determining when to attempt, by the client, a data synchronization to synchronize data on the client device with the data relating to the client changed at the client data store.

In an embodiment, the data synchronization mechanism is a non-real-time data synchronization mechanism. The non-real-time data synchronization mechanism includes determining, by the client, whether the client is running in a foreground of the client device or running in a background of the client device and attempting, by the client, to synchronize the data on the client device with the data relating to the client changed at the client data store when the client device is running in the foreground of the client device. The non-real-time data synchronization mechanism further includes waiting, by the client, until the client is running in the foreground to attempt to synchronize the data on the client device with the data relating to the client changed at the client data store when the client device is running in the background of the client device.

In an embodiment, the type of the data relating to the client changed at the client data store is presence data, contact data, group management data, a push-to-X text message notification, a push-to-X multimedia message service notification, a push-to-talk (PTT) over cellular (PoC) instant personal alert, location tracking data, changes to PTT call in progress notification, a PTT call completed notification, or a combination thereof.

In an embodiment, the data synchronization mechanism is a real-time data synchronization mechanism. The real-time data synchronization mechanism includes attempting, by the client, to synchronize the data on the client device with the data relating to the client changed at the client data store after the data change notification is received regardless of whether the client is running in a foreground of the client device or running in a background of the client device.

In an embodiment, different types of data synchronization mechanisms are selected for different types of data by a user operating the client device, a group administrator, a network administrator, a service operator, a standard, or a combination thereof.

An embodiment method further includes determining, by the client device, whether the data change notification was received after a most recent successful data synchronization on the client device when the client transitions from running in a background of the client device to running in a foreground of the client device and attempting, by the client, to synchronize the data on the client device with the data relating to the client changed at the client data store when the data change notification was received after the most recent successful data synchronization on the client device. The method may further include not attempting, by the client, to synchronize the data on the client device with the data relating to the client changed at the client data store when the data change notification was not received after the most recent successful data synchronization on the client device and the client did not lose network connectivity after the most recent successful data synchronization on the client device.

An embodiment method further includes losing, by the client, network connectivity for at least an interval of time; and attempting, by the client, to synchronize data on the client device with data at the client data store when the client regains network connectivity after losing network connectivity for at least the interval of time.

In an embodiment, the client does not poll the client data store for changes in data relating to the client, and the client is not required to maintain an active connection with the client data store for receiving changes in data relating to the client.

In an embodiment, the data change notification includes at least a portion of the data relating to the client changed at the client data store. The client maintains a first archive of data for the type of the data relating to the client changed at the client data store. The client data store maintains a second archive of data for the type of the data relating to the client changed at the client data store. The data synchronization mechanism is used, by the client, to synchronize the first archive of data with the second archive of data.

In an embodiment, a method includes receiving, by a notification server in a telecommunications services platform, a data change notification. The data change notification indicates a change to data relating to a client at a client data store by one or more services provided by the telecommunications services platform. The method further includes maintaining, by the notification server, a data change notification queue for the client, determining, by the notification server, a state of the data change notification queue, and determining, by the notification server, whether to transmit the data change notification to the client in accordance with the state of the data change notification queue.

In an embodiment, the method further includes further, transmitting, by the notification server, the data change notification to the client when the data change notification queue is in a no-data-pending state. The data change notification queue transitions into the no-data-pending state when the client successfully synchronizes data with the client data store. The method may further include after transmitting the data change notification, transitioning the data change notification queue to a data-pending state.

In an embodiment, the method further includes receiving, by the notification server, one or more additional data change notifications while the data change notification queue is in a data-pending state. The one or more additional data change notifications indicates one or more additional changes to data relating to the client at the client data store by the one or more services. The method further includes enquequing, by the notification server, the one or more additional data change notifications until the client successfully synchronizes data with the client data store. The method further includes not transmitting, by the notification server, the one or more additional data change notifications while the data change notification queue is in the data-pending state.

In an embodiment, the method further includes ignoring, by the notification server, the data change notification when the data change notification queue is in a closed state. The data change notification queue is in the closed state when the client loses network connectivity. The method further includes transmitting, by the notification server, an initial data change notification to the client when the client regains network connectivity.

In an embodiment, the method further includes throttling, by the notification server, the data change notification in accordance with a location of the client and a network resource utilization map.

In an embodiment, determining, by the notification server, whether to transmit the data change notification to the client in accordance with the state of the data change notification queue includes transmitting the data change notification to the client when the notification server determines no data change notifications have been transmitted to the client since a most recent time the client successfully synchronized data with the client data store and not transmitting the data change notification to the client when the notification server determines a previous data change notification has been transmitted to the client since the most recent time the client successfully synchronized data with the client data store.

In accordance with an embodiment, a telecommunications services platform includes a client data store storing data relating to a push-to-talk (PTT) client on a client device, one or more processors, and a computer readable storage medium storing programming for execution by the one or more processors. The programming includes instructions to provide one or more PTT services to the PTT client and provide a notification server. The notification server is configured to receive a data change notification indicating a change to the data relating to the PTT client by the one or more PTT services, transmit the data change notification to the PTT client when the notification server determines no data change notifications have been transmitted to the PTT client since a most recent time the PTT client successfully synchronized data with the client data store, and not transmit the data change notification to the PTT client when the notification server determines a previous data change notification has been transmitted to the PTT client since the most recent time the PTT client successfully synchronized data with the client data store.

In an embodiment, the telecommunications services platform further includes a location server tracking a geographic location of the PTT client. The notification server is further configured to throttle the data change notification in accordance with the geographic location of the PTT client.

In an embodiment, the programming includes further instructions to provide an analytics system. The analytics system is configured to receive user activity reports from the one or more PTT services and maintain a network resources utilization map in accordance with the user activity reports. The notification server is further configured to throttle the data change notification in accordance with the network resources utilization map In an embodiment, the telecommunications services platform further includes a mobile datasync gateway configured to provide access to the client data store by the PTT client.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
  receiving, by a client on a client device, a data change notification, wherein the data change notification indicates a change in data relating to the client at a client data store;
  determining, by the client, a type of the data relating to the client changed at the client data store, wherein the type of the data relating to the client changed at the client data store is Push-to-talk (PTT) over cellular (PoC) presence data, PTT contact data, PTT group management data, a push-to-X text message notification, a push-to-X multimedia message service notification, a PTT instant personal alert, PTT location tracking data, changes to PTT call in progress notification, a PTT call completed notification, or a combination thereof;
  determining, by the client, a data synchronization mechanism in accordance with the type of the data relating to the client changed at the client data store, wherein determining the data synchronization mechanism comprises determining when to attempt, by the client, a data synchronization to synchronize data on the client device with the data relating to the client changed at the client data store, wherein when the data synchronization mechanism is a non-real-time data synchronization mechanism, the non-real-time data synchronization mechanism comprises:
    determining, by the client, whether the client is running in a foreground of the client device or running in a background of the client device; and attempting, by the client, to synchronize the data on the client device with the data relating to the client changed at the client data store when the client device is running in the foreground of the client device, wherein the non-real-time data synchronization mechanism further comprises waiting, by the client, until the client is running in the foreground to attempt to synchronize the data on the client device with the data relating to the client changed at the client data store when the client device is running in the background of the client device.

2. The method of claim 1, wherein when the data synchronization mechanism is a real-time data synchronization mechanism the real-time data synchronization mechanism comprises:
attempting, by the client, to synchronize the data on the client device with the data relating to the client changed at the client data store after the data change notification is received regardless of whether the client is running in a foreground of the client device or running in a background of the client device.

3. The method of claim 1, wherein different types of data synchronization mechanisms are selected for different types of data by a user operating the client device, a group administrator, a network administrator, a service operator, a standard, or a combination thereof.

4. The method of claim 1 further comprising:
determining, by the client device, whether the data change notification was received after a most recent successful data synchronization on the client device when the client transitions from running in a background of the client device to running in a foreground of the client device; and
attempting, by the client, to synchronize the data on the client device with the data relating to the client changed at the client data store when the data change notification was received after the most recent successful data synchronization on the client device.

5. The method of claim 4 further comprising not attempting, by the client, to synchronize the data on the client device with the data relating to the client changed at the client data store when the data change notification was not received after the most recent successful data synchronization on the client device and the client did not lose network connectivity after the most recent successful data synchronization on the client device.

6. The method of claim 1 further comprising:
losing, by the client, network connectivity for at least an interval of time; and
attempting, by the client, to synchronize data on the client device with data at the client data store when the client regains network connectivity after losing network connectivity for at least the interval of time.

7. The method of claim 1, wherein the client does not poll the client data store for changes in data relating to the client, and wherein the client is not required to maintain an active connection with the client data store for receiving changes in data relating to the client.

8. The method of claim 1, wherein the data change notification includes at least a portion of the data relating to the client changed at the client data store, wherein the client maintains a first archive of data for the type of the data relating to the client changed at the client data store, wherein the client data store maintains a second archive of data for the type of the data relating to the client changed at the client data store, and wherein the data synchronization mechanism is used, by the client, to synchronize the first archive of data with the second archive of data.

* * * * *